No. 712,555.  
Patented Nov. 4, 1902.

J. A. LAYLAND.
ROLLER BEARING.
(Application filed Feb. 12, 1902.)

(No Model.)

Witnesses:
C. F. Wisson
M. E. Regan

Inventor:
J. A. Layland
By Southgate & Southgate
Attorneys

UNITED STATES PATENT OFFICE.

JOSEPH A. LAYLAND, OF BOSTON, MASSACHUSETTS.

ROLLER-BEARING.

SPECIFICATION forming part of Letters Patent No. 712,555, dated November 4, 1902.

Application filed February 12, 1902. Serial No. 93,776. (No model.)

*To all whom it may concern:*

Be it known that I, JOSEPH A. LAYLAND, a citizen of the United States, residing at Boston, in the county of Suffolk and State of Massachusetts, have invented a new and useful Roller-Bearing, of which the following is a specification.

This invention relates to that class of antifriction-bearings employing cylindrical rollers.

The especial object of this invention is to provide means for preventing the drilling or wearing of the ends of the rolls into the cage or other part used for confining said rolls.

To these ends this invention consists of the roller-bearing and of the combinations of parts therein, as hereinafter described, and more particularly pointed out in the claims at the end of this specification.

Figure 1:
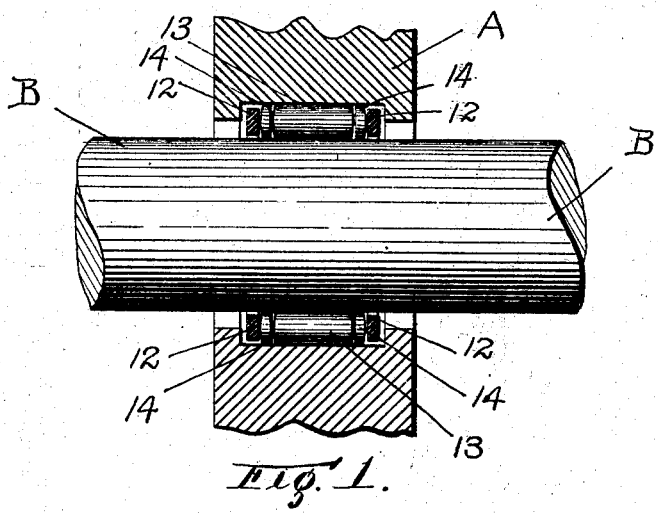
Figure 2:
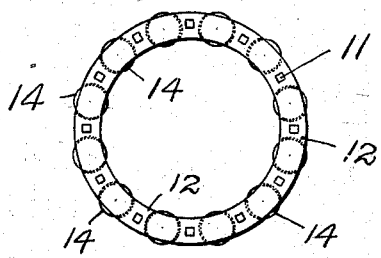
Figure 3:
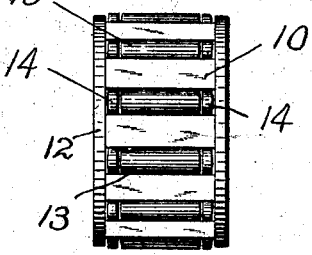
Figure 4:
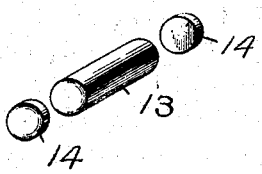

In the accompanying drawings, Figure 1 is a fragmentary view of a bearing with a shaft journaled therein constructed according to my invention. Fig. 2 is an end view of an antifriction-bearing ring constructed according to my invention. Fig. 3 is a side view of the same, and Fig. 4 is a detail perspective view of one of the rolls and the wearing-disks which coöperate therewith.

A serious fault of the roller-bearings which have heretofore been employed has been the tendency of the rolls to drill or bore holes through the cage ends, thus destroying the bearing. To overcome this difficulty, it has been proposed to harden or temper the cage ends. In practice this is objectionable on account of the expense which is necessarily involved and for the reason that the hardening of the cage ends produces a brittle construction, which is liable to be broken. In one instance also it has been proposed to use bearing-balls at the ends of the rolls. The area of contact of the bearing-balls as thus located is in practice, however, not sufficient to produce the best results, and as these balls are usually hardened the balls themselves have a tendency to drill or wear the cage ends. To overcome these objections and to provide for more efficiently taking care of the wear of the hardened-steel rolls, the rolls are combined with wearing-disks, which are dropped into place between the ends of the rolls and the cage ends.

Referring to the accompanying drawings for a detail description of a roller-bearing constructed according to my invention, A designates a bearing piece or box. Passing through the bearing-box A is a shaft B, and interposed between the box A and shaft B is a roller-bearing constructed according to my invention. As herein illustrated, this roller-bearing comprises a cage consisting of the staves or separating-pieces 10 and cage ends 11.

As shown in Fig. 2, the separating-pieces or staves 10 are preferably provided with dowels or pins 12 for fastening the parts of the cage together. Mounted in the cage as thus constructed are the rollers 13, and dropped into place at each end of the rollers 13 are wearing-disks 14. The inner faces of the wearing-disks are preferably flat or plane, while their outer faces, which engage the cage ends, may be slightly crowned or rounding. The diameter of the wearing-disks 14 is slightly less than the diameter of the rolls 13, so that the wearing-disks will not engage the shaft which is mounted in the bearing and will have no tendency to groove or channel the shaft. By means of this construction the rate of rotation of the wearing-disks will be less than the rate of rotation of the rolls 13, and inasmuch as the wearing-disks 14 are comparatively thin the bearing-rolls 13 may be considerably longer than in constructions where balls are employed at the ends of the bearing-rollers.

In practice the wearing-disks need not be hardened, being left soft enough to protect the cage ends, while the area of contact of said wearing-disks will be large enough to prevent the construction from rapidly wearing out.

I am aware that changes may be made in practicing my invention by those who are skilled in the art without departing from the scope thereof as expressed in the claims. I do not wish, therefore, to be limited to the construction I have herein specifically shown and described; but What I do claim, and desire to secure by Letters Patent of the United States, is—

1. In a roller-bearing, the combination of a cage, comprising end plates, separating-bars connecting the end plates, rolls confined in place by said separating-bars, and wearing-disks arranged coaxially with the rolls for preventing the rolls from wearing the end plates.

2. In a roller-bearing, the combination of a frame or cage, comprising end plates, separating-pieces connecting the end plates, rolls confined in place by the separating-pieces, and wearing-disks of smaller diameter than the rolls arranged coaxially with the rolls for preventing the rolls from wearing the end plates.

3. In a roller-bearing, the combination of a cage, consisting of end plates, separating-pieces connecting the end plates, hardened-steel rolls confined in place by the separating-pieces, and wearing-disks of smaller diameter than the rolls arranged coaxially with the rolls and interposed between the end plates and the ends of the hardened-steel rolls to prevent the rolls from wearing the end plates.

In testimony whereof I have hereunto set my hand in the presence of two subscribing witnesses.

JOSEPH A. LAYLAND.

Witnesses:
 HIRAM BLAKE,
 JOSEPH H. WASHBURN.